United States Patent
Lorentz et al.

(10) Patent No.: US 8,452,499 B2
(45) Date of Patent: May 28, 2013

(54) SYSTEM FOR ALLOCATING TRANSMISSION CLUTCH WEAR

(75) Inventors: Timothy Lorentz, Morton, IL (US);
Mathew Guldan, Washington, IL (US);
Hoon Lee, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 99 days.

(21) Appl. No.: 13/218,130

(22) Filed: Aug. 25, 2011

(65) Prior Publication Data

US 2013/0054098 A1    Feb. 28, 2013

(51) Int. Cl.
*G06F 7/00* (2006.01)
*G06F 17/00* (2006.01)
*G06F 19/00* (2006.01)

(52) U.S. Cl.
USPC .......... 701/53; 192/85.62; 192/215; 192/216; 192/111.1; 477/166; 477/180

(58) Field of Classification Search
USPC .............. 701/53; 192/215–216, 16, 30 R, 192/31, 41 R, 111.1, 12 R, 15, 111.14; 477/166, 477/180–183
See application file for complete search history.

(56) References Cited

U.S. PATENT DOCUMENTS

| | | | |
|---|---|---|---|
| 3,968,707 A * | 7/1976 | Dach | 477/150 |
| 4,091,902 A * | 5/1978 | Hamada | 477/89 |
| 4,596,165 A * | 6/1986 | Miki et al. | 475/65 |
| 4,848,530 A | 7/1989 | Chess | |
| 4,989,470 A | 2/1991 | Bulgrien | |
| 5,012,416 A | 4/1991 | Bulgrien et al. | |
| 5,353,662 A | 10/1994 | Vaughters | |
| 5,456,344 A * | 10/1995 | Nellums | 192/13 R |
| 5,704,873 A * | 1/1998 | Iwata et al. | 477/115 |
| 5,916,291 A | 6/1999 | McKee | |
| 6,484,858 B1 * | 11/2002 | Mimura | 192/45.006 |
| 6,910,988 B2 | 6/2005 | Carlsson | |
| 7,267,634 B2 | 9/2007 | Nakagawa et al. | |
| 7,985,156 B2 * | 7/2011 | Han | 475/162 |
| 2008/0287241 A1 * | 11/2008 | Han | 475/16 |
| 2012/0296530 A1 * | 11/2012 | Hyodo et al. | 701/50 |

FOREIGN PATENT DOCUMENTS

| | | | |
|---|---|---|---|
| DE | 2360513 | * | 12/1973 |
| JP | 55-25746 | * | 2/1980 |
| JP | 7-115011 | * | 5/1995 |
| JP | 11-179841 | * | 6/1999 |
| JP | 2009-283138 | * | 12/2009 |
| WO | PCT/JP2010/072497 | * | 6/2012 |

OTHER PUBLICATIONS

A Gatekeeper energy management strategy for ECVT hybrid vehicle propulsion utilising ultracapacitors; Auer, J.; Sartorelli, G.; Miller, J.; Hybrid Vehicle Conference, IET The Institution of Engineering and Technology, 2006; Topic(s): Transportation Publication Year: 2006, pp. 79-90.*

(Continued)

*Primary Examiner* — Cuong H Nguyen
(74) *Attorney, Agent, or Firm* — Leydig, Voit & Mayer (57) ABSTRACT

A control system for a transmission engages three clutches to create braking within the transmission to slow a machine during a shuttle shifting operation. The control system may apply the clutches so as to allocate wear between the clutches equally or unequally, as desired.

20 Claims, 10 Drawing Sheets

OTHER PUBLICATIONS

A new hybrid actuator approach for force-feedback devices; Rossa, C.; Lozada, J.; Micaelli, A.; Intelligent Robots and Systems (IROS), 2012 IEEE/RSJ International Conference on; Digital Object Identifier: 10.1109/IROS.2012.6385784 Publication Year: 2012 , pp. 4054-4059.*

Capstan brake: Passive brake for tendon-driven mechanism; HyunKi In et al., Intelligent Robots and Systems (IROS), 2012 IEEE/RSJ International Conf. on; Digital Object Identifier: 10.1109/IROS.2012.6386106; Pub. Year: 2012 , pp. 2301-2306.*

\* cited by examiner

SYSTEM FOR ALLOCATING TRANSMISSION CLUTCH WEAR

TECHNICAL FIELD

This disclosure relates generally to a system for controlling a transmission of a machine and, more particularly, to a system for controlling the transmission during shuttle shifting to allocate clutch wear within the transmission.

BACKGROUND

Transmission systems use a number of different transmission configurations and control schemes. Such transmissions typically include a plurality of intermeshing gears that are either fixed to transmission shafts or that rotate freely on the shafts. Clutches associated with the freely rotating gears may be selectively engaged to establish a series of speed ratios between a prime mover output shaft and transmission output shaft to transmit torque at a desired speed to drive a machine. Control systems for controlling the clutches typically include electronic circuitry that responds to operator controls such as those directing speed and/or shuttle shifts. The control system may send electrical signals to hydraulic valves that control the clutches. The control system thus causes the clutches to engage and disengage in predetermined combinations to accelerate, decelerate, and drive a machine as desired by the operator.

Some of the control systems provide a directional or shuttle shifting capability that permits an operator to command direct shifting between a forward gear and a reverse gear by movement of a gear shift lever or similar command device directly to the target gear. Various systems have been used in connection with directional or shuttle shifting operations to slow the velocity of the machine during the operation. In general, such systems disengage the clutches corresponding to the then current gear ratio and eventually engage clutches corresponding to the target gear ratio.

U.S. Pat. No. 4,989,470 discloses a system that permits controlled deceleration of a vehicle during shuttle shifts by disengaging the transmission from the engine by disengaging one of the clutches within the transmission. A different clutch is then engaged to create braking or tie-up within the transmission to create a load on the vehicle and slow the rotation of the transmission and the velocity of the vehicle. Once the vehicle has reached a desired velocity, typically close to zero, the clutch used for braking is disengaged and another clutch engaged for accelerating the vehicle in the desired direction.

The foregoing background discussion is intended solely to aid the reader. It is not intended to limit the innovations described herein nor to limit or expand the prior art discussed. Thus the foregoing discussion should not be taken to indicate that any particular element of a prior system is unsuitable for use with the innovations described herein, nor is it intended to indicate any element, including solving the motivating problem, to be essential in implementing the innovations described herein. The implementations and application of the innovations described herein are defined by the appended claims.

SUMMARY

A clutch control system for a transmission of a machine is provided. In one aspect, the clutch control system allocates clutch wear during shuttle shifting of the transmission. The transmission is operatively connected to a prime mover to propel the machine and has a first directional clutch and a second directional clutch. The first directional clutch and the second directional clutch are operatively connected to an input shaft of the transmission. A plurality of additional clutches are operatively connected to an output shaft of the transmission. A first of the additional clutches operates as an engagement clutch. A second of the additional clutches operates as a first braking clutch. A third of the additional clutches operates as a second braking clutch. A controller is configured to transmit a first engagement signal to engage the engagement clutch and transmit an isolation signal to disengage the first directional clutch and isolate the prime mover from the additional clutches. The controller may also transmit a first braking signal to the first braking clutch to apply a first braking force and transmit a second braking signal to the second braking clutch to apply a second braking force before reducing the first braking force. The engagement clutch, the first braking clutch and the second braking clutch cooperate to apply a combined force to slow rotation of the output shaft. The controller may also transmit a first reduction signal to one of the engagement clutch, the first braking clutch, and the second braking clutch to reduce the combined force and transmit a second reduction signal to another of the engagement clutch, the first braking clutch, and the second braking clutch to reduce the combined force. The controller may also transmit a second engagement signal to engage the second directional clutch upon the occurrence of a designated trigger event.

In another aspect, a clutch control system allocates clutch wear during shuttle shifting of a transmission. The transmission is operatively connected to a prime mover to propel the machine. The transmission has a plurality of clutches in a first set operatively connected to a rotatable input shaft of the transmission, and a plurality of clutches in a second set operatively connected to a rotatable output shaft of the transmission. The first set of clutches may operate to isolate the prime mover from the second set of clutches. The second set of clutches include an engagement clutch, a first braking clutch, and a second braking clutch. A controller is configured to transmit a first engagement signal to engage the engagement clutch and transmit an isolation signal to disengage one of the clutches of the first set to isolate the second set of clutches from the prime mover. The controller may also transmit a first braking signal to the first braking clutch to apply a first braking force and transmit a second braking signal to the second braking clutch to apply a second braking force before reducing the first braking force. The engagement clutch, the first braking clutch and the second braking clutch cooperate to apply a combined force to slow rotation of the output shaft. The controller may also transmit a first reduction signal to one of the engagement clutch, the first braking clutch, and the second braking clutch to reduce the combined force and transmit a second reduction signal to another of the engagement clutch, the first braking clutch, and the second braking clutch to reduce the combined force. The controller may also transmit a second engagement signal to engage another of the clutches of the first set upon the occurrence of a designated trigger event.

In a further aspect, a method of allocating clutch wear during shuttle shifting of a transmission is provided. The method may include engaging an engagement clutch and disengaging a first directional clutch to isolate additional clutches from a prime mover. A first braking clutch may be applied to apply a first braking force and a second braking clutch applied to apply a second braking force before reducing the first braking force. The engagement clutch, the first braking clutch and the second braking clutch may cooperate to apply a combined force to slow rotation of an output shaft.

One of the engagement clutch, the first braking clutch, and the second braking clutch may be disengaged to reduce the combined force and another of the engagement clutch, the first braking clutch, and the second braking clutch may be disengaged to reduce the combined force. The second directional clutch may be engaged upon the occurrence of a designated trigger event.

DETAILED DESCRIPTION

Figure 1:
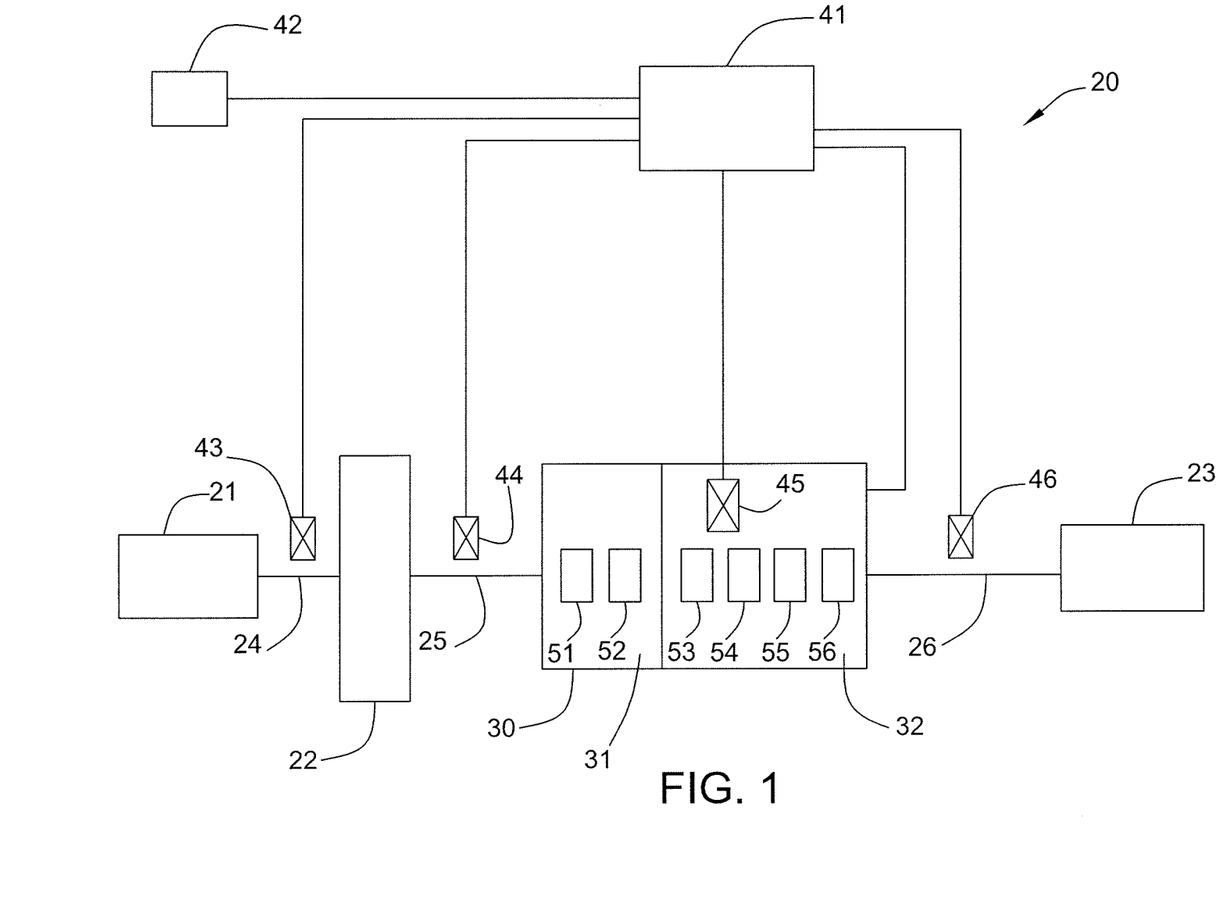
FIG. 1 is a schematic illustration of a power train in accordance with the disclosure.

FIG. 1 depicts a power train 20 of a machine (not shown) that includes a prime mover such as an internal combustion engine 21, a torque converter 22, a multi-speed transmission 30, and a drive train 23. The internal combustion engine 21 is connected to the torque converter 22 via shaft 24, the torque converter 22 is connected to the transmission 30 via rotatable input shaft 25, and the transmission 30 is connected to the drive train 23 via rotatable output shaft 26.

Transmission 30 includes a plurality of gears (not shown) that may be engaged in various combinations to achieve desired gear ratios between input shaft 25 and output shaft 26. In addition, the gears control the direction of rotation of output shaft 26 to establish forward and reverse movement of the machine. A plurality of clutches are located within the transmission. Although six clutches 51-56 are depicted, transmission 30 may include other numbers of clutches as desired. Gear shifts are accomplished by selectively engaging and disengaging combinations of the clutches. The clutches may be actuated by hydraulic pressure and controlled by an electronic control module or controller 41.

The control system 40 of the power train 20 may include one or more input devices 42 to select a desired gear ratio and direction. The controller 41 receives the gear selection signal and controls the operation of the hydraulic system that engages and disengages the clutches. The controller 41 may also receive various other input signals representative of various operating parameters. Such other inputs signals may include an engine speed signal from an engine speed sensor 43, an transmission input speed signal from a transmission input speed sensor 44, one or more internal transmission speed signal from one or more internal transmission speed sensors 45, and a transmission output speed signal from a transmission output speed sensor 46.

Controller 41 may be an electronic controller that operates in a logical fashion to perform operations, execute control algorithms, store and retrieve data and other desired operations. The controller 41 may include or access memory, secondary storage devices, processors, and any other components for running an application. The memory and secondary storage devices may be in the form of read-only memory (ROM) or random access memory (RAM) or integrated circuitry that is accessible by the controller 41. Various other circuits may be associated with the controller 41 such as power supply circuitry, signal conditioning circuitry, driver circuitry, and other types of circuitry. The controller 41 may be a single controller or may include more than one controller disposed to control various functions and/or features of the machine as well as the transmission 30. As used herein, the term "controller" is meant to include one or more controllers that may be associated with the transmission 30 and that may cooperate in controlling various functions and operations of the transmission. The functionality of the controller 41 may be implemented in hardware and/or software without regard to the functionality. One or more data maps relating to the operating conditions of the transmission 30 may be stored in the memory of controller 41. Each of these maps may include a collection of data in the form of tables, graphs, and/or equations.

Figure 2:
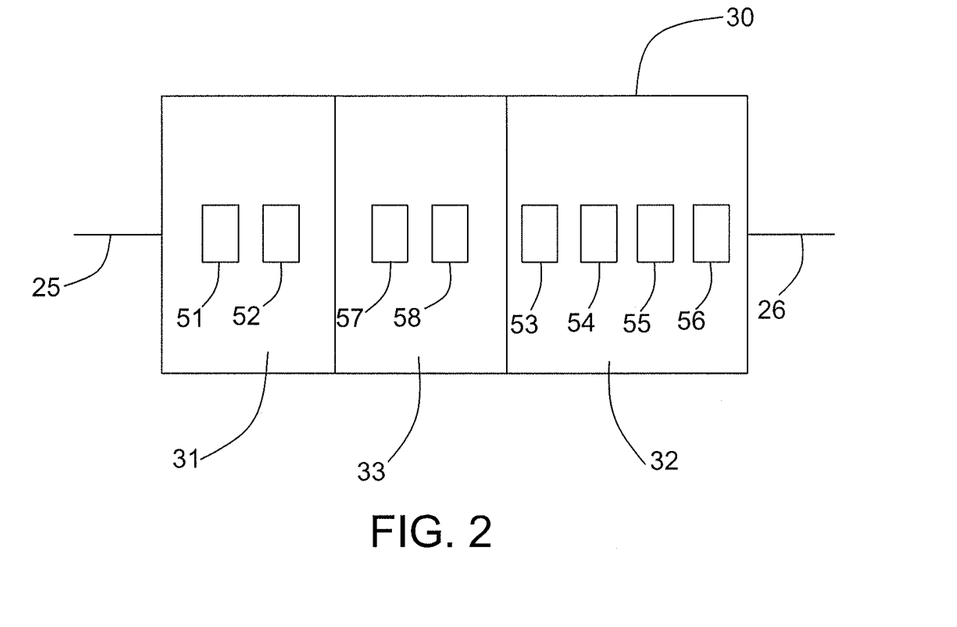
FIG. 2 is a schematic illustration of an alternate embodiment of a transmission in accordance with the disclosure.
Figure 3:
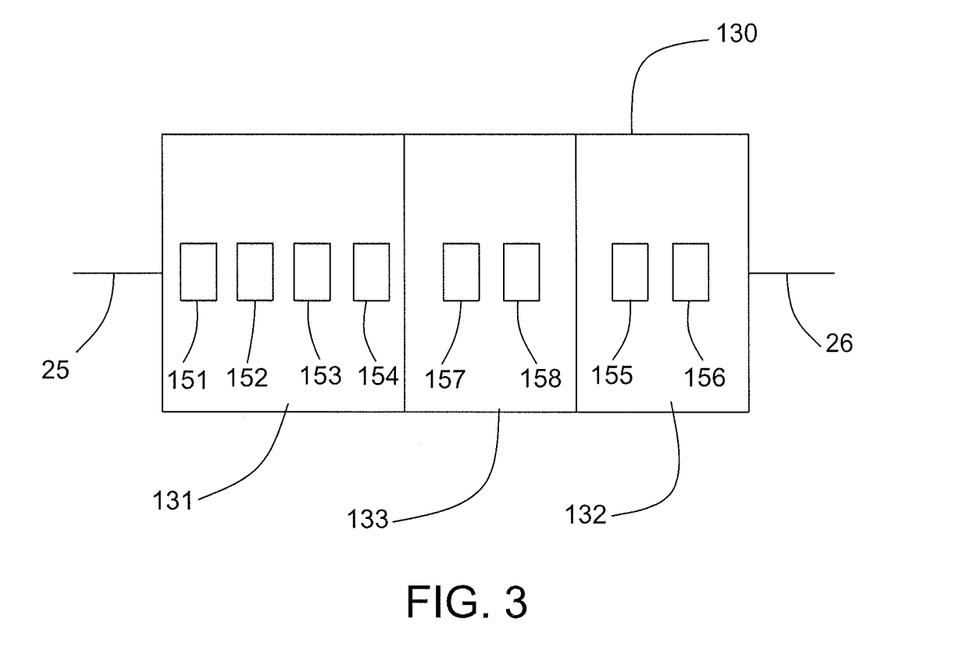
FIG. 3 is a schematic illustration of another alternate embodiment of a transmission in accordance with the disclosure.

The transmission 30 may be configured in a number of different manners. In one configuration depicted in FIG. 1, transmission 30 includes a front section 31 operatively connected to input shaft 25 and a rear section 32 operatively connected to output shaft 26. In such configuration, a first set of clutches, such as clutches 51-52, is located in the front section 31 and may operate as a first directional clutch and a second directional clutch for shifting between a first direction (e.g., forward) and a second opposite direction (e.g., reverse). A second set of clutches, such as clutches 53-56, is located in rear section 32 and may operate as speed clutches for shifting between different gear ratios. If desired, an intermediate section 33 (FIG. 2) may be provided between front section 31 and rear section 32. Intermediate section 33 may include an additional set of clutches 57-58 that operates to provide additional functionality within transmission 30. The additional clutches may form an additional set of clutches or may be a portion of the first set or a portion of the second set of clutches. In another alternate configuration depicted in FIG. 3, front section 131 of transmission 130 includes a first set of clutches, such as speed clutches 151-154, that is used for shifting between different gear ratios and rear section 132 includes a second set of clutches, such as directional clutches 155-156, that is used for shifting between forward and reverse. An intermediate section 133 may be positioned between front section 131 and rear section 132, if desired. The intermediate section 133 may include an additional set of clutches 157-158 that operates to provide additional functionality within transmission 130. Each of the sections of the transmissions may include other numbers of clutches as necessary for carrying out desired shifting operations.

When engaging or applying clutches to shift gears, it is generally desirable to engage an on-coming clutch and an off-going clutch in a predetermined sequence to avoid undesirable braking or tie-up within the transmission 30. Such braking may result in undesirable energy losses during a shifting operation. In some instances, however, such as during directional or shuttle shifting, it may be desirable to utilize such braking to decelerate the machine as described above with respect to U.S. Pat. No. 4,989,470.

Figure 4:
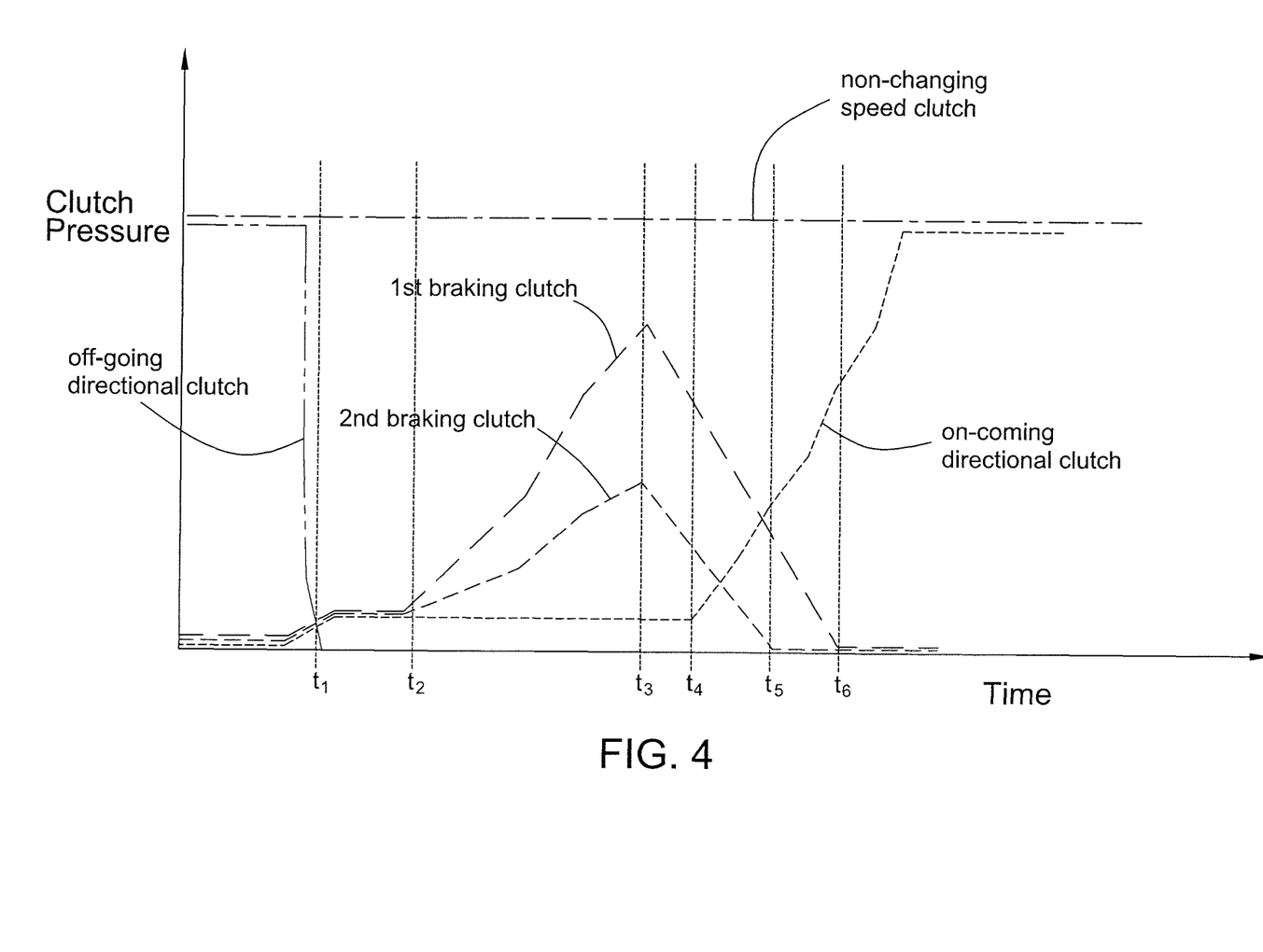
FIG. 4 is a graph illustrating clutch engagements and disengagements during a shuttle shifting operation in accordance with the disclosure.

Referring to FIG. 4, a directional or shuttle shifting operation is depicted. The off-going directional clutch (such as clutch 51 in FIG. 1) is released at a first designated trigger event $t_1$ which isolates the remaining portion of transmission 30 from the internal combustion engine 21. More specifically, releasing the off-going directional clutch isolates the rear section 32 of the transmission 30 from the front section 31. By isolating the internal combustion engine 21 from the load of the transmission 30, fuel may be saved during the shuttle shifting operation as the internal combustion engine is not used to slow the machine.

During the shuttle shifting operation or process, a first speed clutch (such as clutch 53 in FIG. 1) of the rear section 32 of the transmission 30 remains engaged with a constant clutch pressure and thus is designated in FIG. 4 as the non-changing speed clutch. Maintaining the engagement of the non-changing speed clutch or engagement clutch results in the rear section 32 of the transmission 30 remaining operatively connected to output shaft 26. Since output shaft 26 is connected to drive train 23, continued movement of the machine due to its momentum will cause the continued rotation of the rear section 32 of the transmission 30.

In order to increase the deceleration of the machine, a second speed clutch (such as clutch 54 in FIG. 1) may be engaged at a second designated trigger event $t_2$ and is designated as a first braking clutch in FIG. 4. The interaction of the non-changing speed clutch and the first braking clutch creates a desired level of braking or tie-up within the transmission 30 to increase the rate at which the machine is decelerated. However, utilizing the second speed clutch as a braking clutch creates additional wear on that clutch. To reduce the wear on the second speed clutch, a third speed clutch (such as clutch 55 in FIG. 1) may also be engaged at a second designated trigger event $t_2$ that, in conjunction with the first speed clutch and the second speed clutch, provides further braking or tie-up within the transmission. In FIG. 4, the third speed clutch is designated as a second braking clutch and functions to further slow the rotation of the rear section 32 of transmission 30 and thus output shaft 26. In other words, the non-changing speed clutch, the first braking clutch and the second braking clutch cooperate to apply a combined force that slows the rotation of the output shaft 26 of transmission 30.

As the first braking clutch and the second braking clutch slip, they distribute or allocate the braking function between the two clutches and convert energy in the form of momentum of the machine into energy that is dissipated by the clutches. The first braking clutch and second braking clutch may be engaged generally simultaneously at a designated trigger event or point as depicted at second designated trigger event $t_2$. In the alternative, one may be applied at a second designated trigger event $t_2$ and then the other at a subsequent second designated trigger event $t_2$. In other words, each of the first braking clutch and the second braking clutch would have its own second designated trigger event such as $t_{2a}$ and $t_{2b}$ (not shown) in FIG. 4 but would be spaced apart along the "Time" axis. As depicted in FIG. 4, greater pressure is applied by the first braking clutch as compared to the second braking clutch. This may be due to one or more factors. For example, as discussed below, the first braking clutch may have a larger surface area than the second braking clutch or may be formed of a different material and thus may be better able to efficiently absorb the energy of the braking operation.

Once the shuttle shifting operation has reached a third designated trigger event $t_3$, the controller 41 directs a reduction in pressure to the first braking clutch and the second braking clutch so that the tie-up or braking within the transmission 30 is reduced. As the pressures of the first braking clutch and the second braking clutch are reduced, the second directional clutch (designated as the on-coming directional clutch in FIG. 4) may be engaged at a fourth designated trigger event $t_4$ which causes the re-engagement of input shaft 25 with transmission 30 and thus causes the machine to accelerate in the desired, opposite direction.

Many alternatives to the timing of the steps of the process depicted in FIG. 4 are contemplated. For example, although the first braking clutch and the second braking clutch are depicted as engaging at approximately the same time, the timing of their engagement (at second designated trigger events $t_2$) may be varied based upon many different factors. In some applications, it may be desirable for the first braking clutch and the second braking clutch to be engaged sequentially. However, to reduce the wear on the clutches, it may be desirable for the second braking clutch to begin to be engaged before the first braking clutch begins to disengage. In other words, it may be desirable for the engagement (at second designated trigger event $t_2$) of each braking clutch to occur before the disengagement of the other braking clutch begins at third designated trigger event $t_3$.

Although the disengagement of the first braking clutch and the second braking clutch may begin generally simultaneously at third designated trigger event $t_3$, the disengagement operation could occur sequentially with the disengagement of either braking clutch beginning before the other. Still further, although the second braking clutch is depicted as being completely disengaged (at fifth designated trigger event $t_5$) before the first braking clutch is completely disengaged (at sixth designated trigger event $t_6$), the order of complete disengagement could be reversed or could be simultaneous.

The pressure of the on-coming directional clutch may begin to rise (at fourth designated trigger event $t_4$) before either of the first braking clutch or the second braking clutch is completely disengaged or released (at sixth designated trigger event $t_6$ and fifth designated trigger event $t_5$, respectively). In an alternate configuration, the on-coming directional clutch could begin to be engaged (at fourth designated trigger event $t_4$) after either of the first braking clutch or the second braking clutch is completely disengaged. In some applications, it may be desirable for the on-coming directional clutch to begin to be engaged (at fourth designated trigger event $t_4$) after both the first braking clutch and the second braking clutch are completely disengaged.

The timing of the second through fourth designated trigger events $t_2$-$t_4$ as well as the rates of change (slopes) of the pressures of the various clutches may be set or determined in a number of different ways. In one example, some aspects of the operation may be based upon real-time monitoring of the operation of the machine. For example, the first braking clutch and the second braking clutch could begin to be engaged at second designated trigger event $t_2$ after a designated amount of time or time period has elapsed or passed following the disengagement of the off-going directional clutch at first designated trigger event $t_1$. The velocity of the machine may be monitored such as by transmission output speed sensor 46. The timing of the designated trigger event at which the pressure of the first braking clutch and the second braking clutch are reduced (at third designated trigger event $t_3$) may be based upon monitoring of the velocity of the machine as determined by a signal from the transmission output speed sensor 46. In some cases, it may be desirable for the third designated trigger event $t_3$ to occur when the velocity of the machine, and thus the speed of rotation of output shaft 26, reaches a predetermine velocity. In some cases, such velocity may be approximately zero. Similarly, the engagement of the on-coming directional clutch (at fourth designated trigger event $t_4$) may also be based upon monitoring of the velocity of the machine.

In another example, the second through fourth designated trigger events $t_2$-$t_4$ may be determined from a data map contained within or accessible by the controller based upon the velocity of the machine and other operating conditions including the current and target gear ratios at the time of the command for shuttle shifting or the inception of the shuttle shifting operation. In still another example, each of the second through fourth designated trigger events $t_2$-$t_4$ may be fixed so as not to vary with the velocity and other operating conditions of the machine.

If desired, the data map might also designate the rate of change or slope of the pressure of each of the clutches. For example, the rate of increase in pressure of the first braking clutch, second braking clutch, and the on-coming directional clutch may be based upon the velocity and operating conditions of the machine as well as the current and target gear ratios. In another example, the rate of change or slope of the pressures may be set so as to be constant regardless of the velocity and operating conditions.

It should be noted that the rear section 32 of transmission 30 has a plurality of speed clutches that may be used for shifting between different gear ratios, and any of the speed clutches may be used as the non-changing speed clutch or engagement clutch and any of the other speed clutches may be used as the first braking clutch and the second braking clutch. In addition, if desired, additional speed clutches may be used to provide a third or more additional braking clutches. In such case, additional steps may be added to the process of FIG. 5 between stage 66 and stage 67 so that the additional braking clutches are engaged and between stage 69 and stage 70 so that all but one of the engaged clutches of the rear section 32 of transmission 30 are disengaged. If the front section 31 of transmission 30 includes more than two directional clutches, any of the directional clutches may be used as the off-going directional clutch and the on-coming directional clutch so long as the off-going directional clutch isolates the transmission 30 from the internal combustion engine 21 and the on-coming directional clutch re-engages the connection between the internal combustion engine 21 and the transmission 30.

Figure 5:
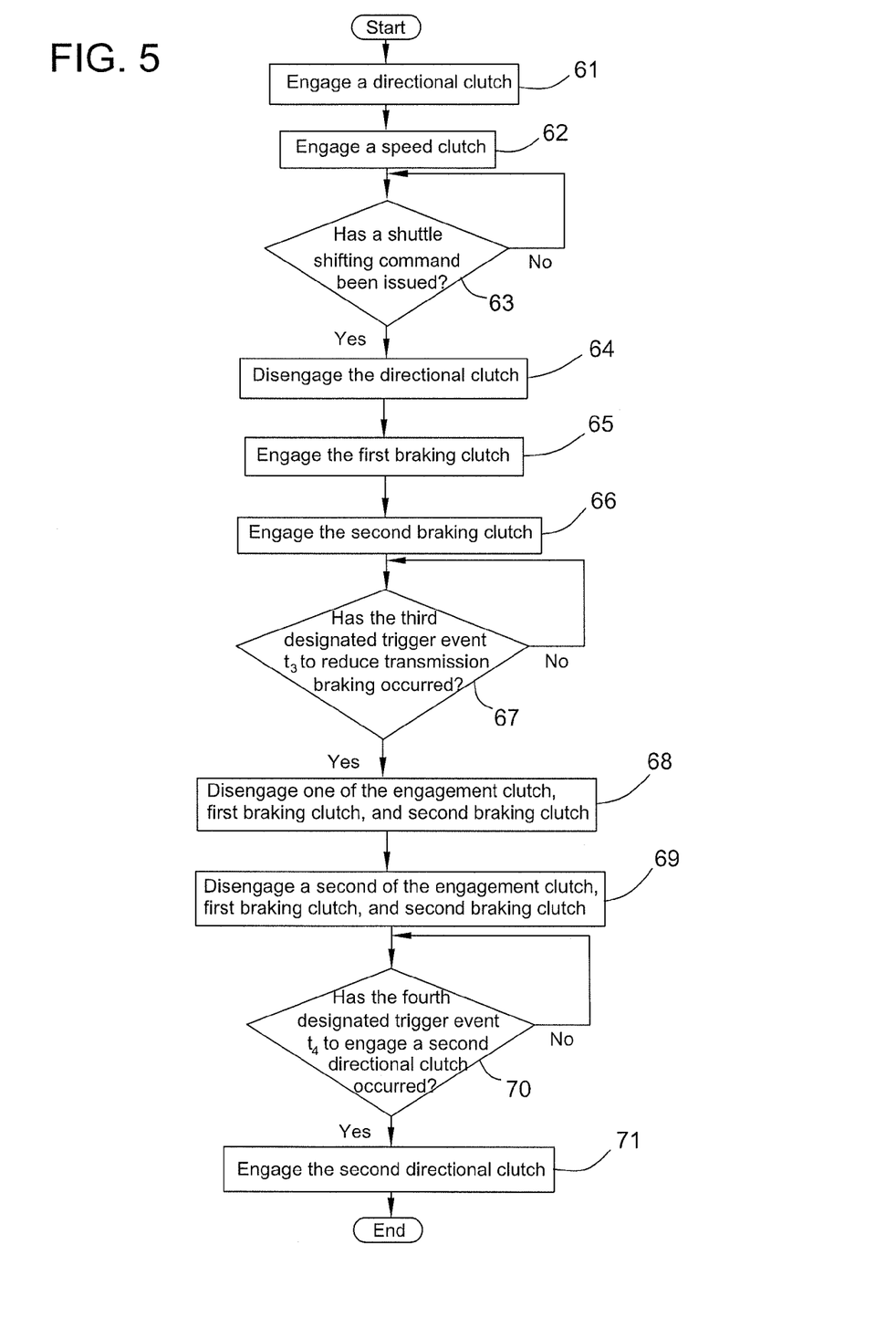
FIG. 5 is a flow diagram illustrating the process of FIG. 4.

Referring to FIG. 5, a flowchart showing the process corresponding to the shuttle shifting operation of FIG. 4 is depicted. Controller 41 initially transmits an engagement signal at stage 61 to engage a directional clutch. Controller 41 transmits a first engagement signal at stage 62 to engage a first speed clutch. The first speed clutch is designated the non-changing speed clutch in FIG. 4 and functions as an engagement clutch. Once a command is issued for shuttle shifting at stage 63, the controller 41 transmits an isolation signal at stage 64 to disengage the directional clutch and isolate the prime mover from the clutches of the rear section 32 of transmission 30. Controller 41 transmits a first braking signal at stage 65 to engage a second speed clutch which is designated the first braking clutch in FIG. 4. Controller 41 transmits a second braking signal at stage 66 to engage a third speed clutch which is designated the second braking clutch in FIG. 4.

At stage 67, the controller 41 determines whether the third designated trigger event $t_3$ has occurred. Once the third designated trigger event $t_3$ has occurred, the controller 41 transmits a first reduction signal at stage 68 to disengage one of the engagement clutch, the first braking clutch, and the second braking clutch. The controller 41 then transmits a second reduction signal at stage 69 to disengage another of the engagement clutch, the first braking clutch, and the second braking clutch. Upon the occurrence of the fourth designated trigger event $t_4$ at stage 70, controller 41 transmits a second engagement signal at stage 71 to engage a second directional clutch which causes the re-engagement of input shaft 25 with transmission 30 and thus causes the machine to accelerate in the desired direction.

Figure 6A:
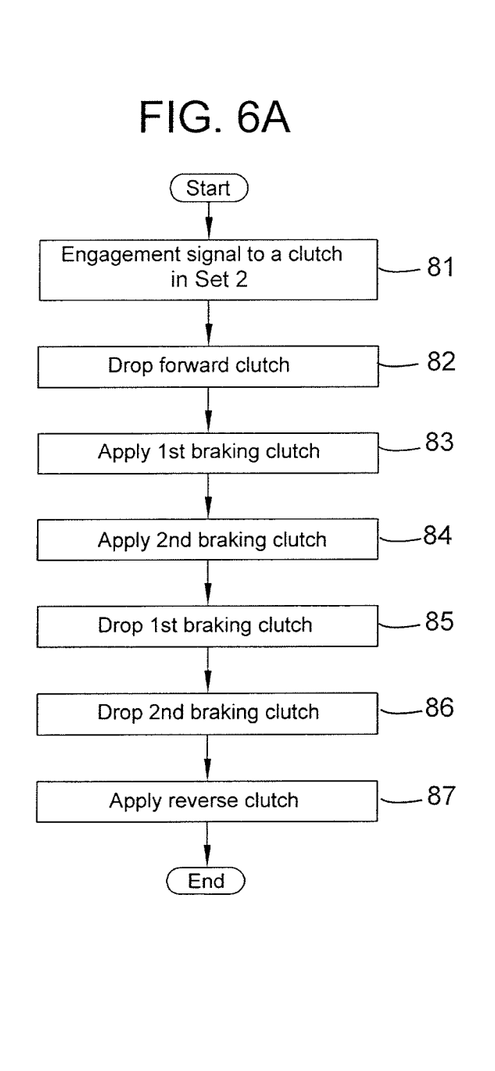
FIG. 6A is a flow diagram and FIG. 6B is a table illustrating the sequence of clutch engagements and disengagements in accordance with FIG. 4.
Figure 6B:
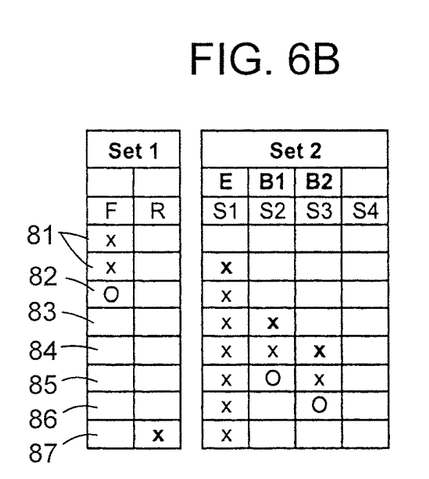

Referring to FIGS. 6A and 6B, a flowchart and a table show a possible sequence of engagement and disengagement and the overlapping engagement of the clutches but does not reflect the amount of pressure or degree of engagement. The forward clutch (F) and a first speed clutch (S1) are initially engaged at stage 81. The forward clutch (F) is designated as the off-going directional clutch at stage 82 and the first speed clutch (S1) is designated as the engagement clutch (E). A second speed clutch (S2) is engaged at stage 83 and is designated as the first braking clutch (B1). A third speed clutch (S3) is engaged at stage 84 and is designated as the second braking clutch (B2). At the third designated trigger event $t_3$, the first braking clutch (B1) (stage 85) and the second braking clutch (B2) (stage 86) are disengaged. While the engagement clutch (E) remains engaged, the reverse clutch (R) is engaged at stage 87 and becomes the on-coming directional clutch.

Figure 7A:
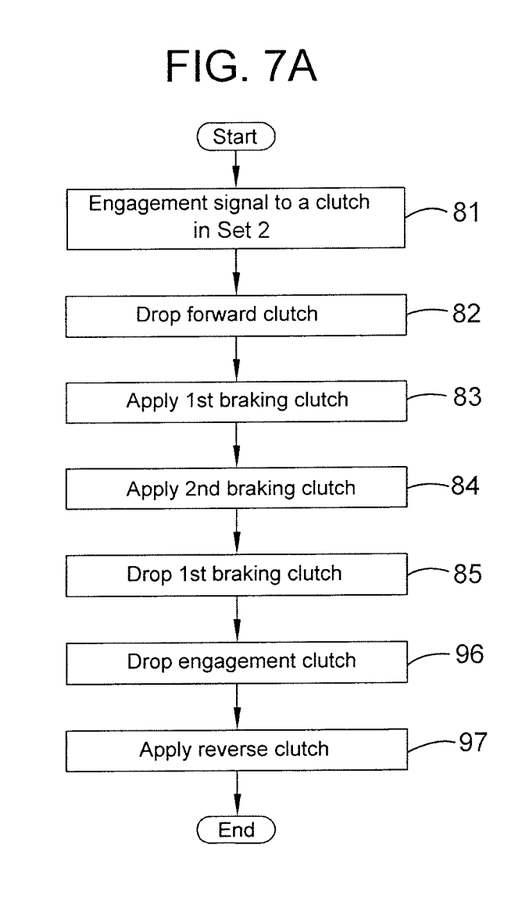
FIG. 7A is a flow diagram and FIG. 7B is a table similar to those of FIGS. 6A and 6B but with the disengagement of the engagement clutch and the second braking clutch reversed.
Figure 7B:
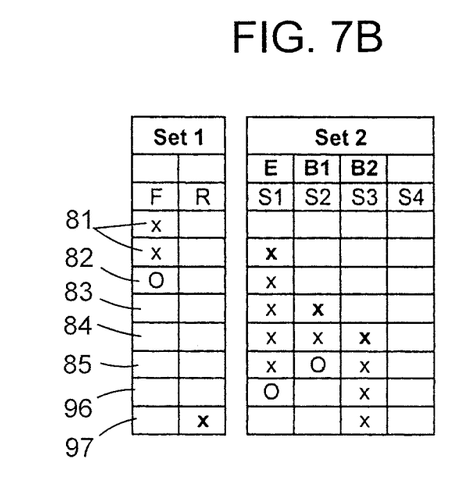
Figure 8A:
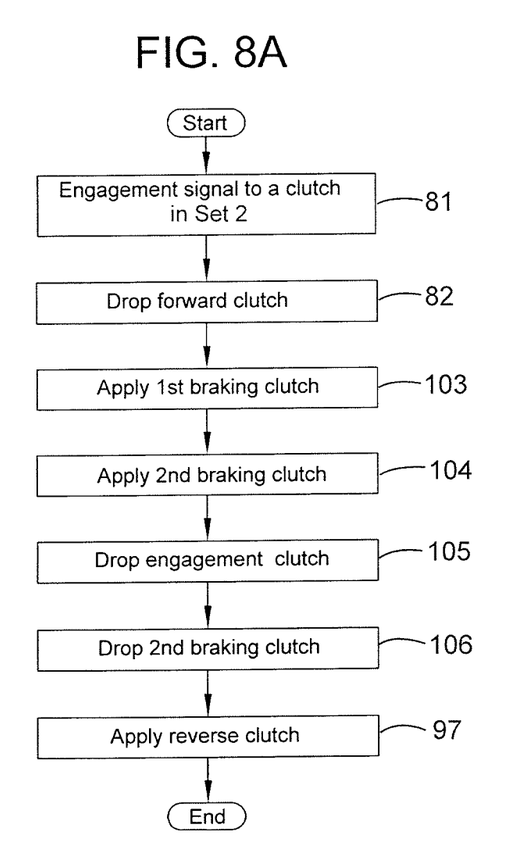
FIG. 8A is a flow diagram and FIG. 8B is a table similar to those of FIGS. 7A and 7B but with an alternate process for the engagement and disengagement of the clutches.
Figure 8B:
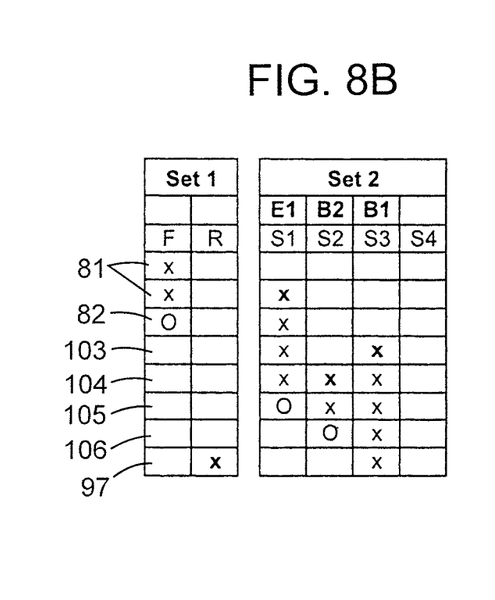
Figure 9A:
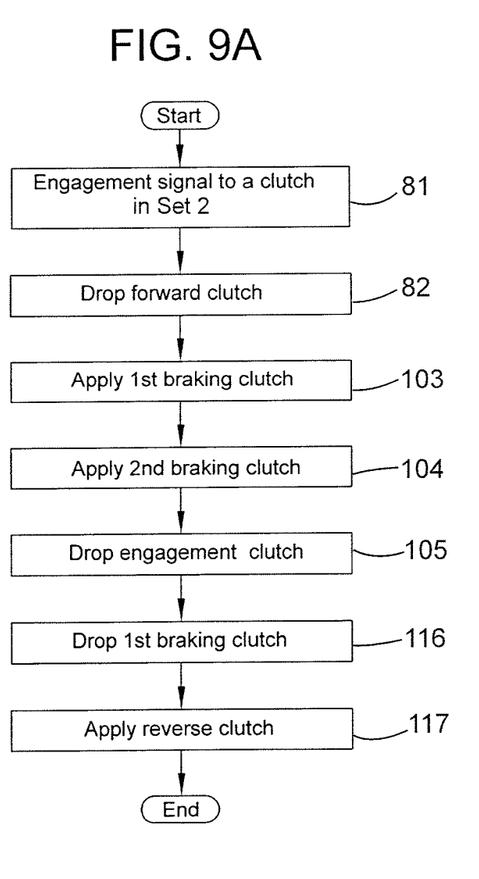
FIG. 9A is a flow diagram and FIG. 9B is a table similar to those of FIGS. 8A and 8B but with the disengagement of the first braking clutch and the second braking clutch reversed.
Figure 9B:
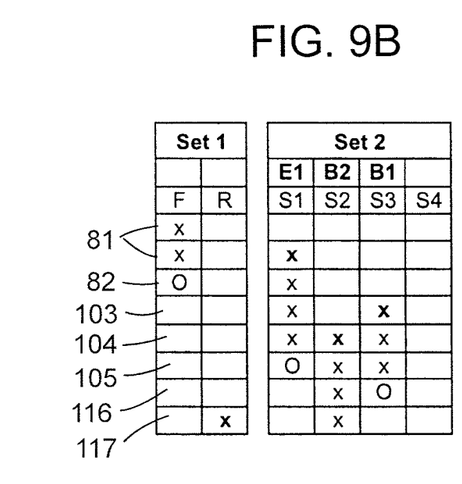

FIGS. 7A-9A are flowcharts similar to FIG. 6A and FIGS. 7B-9B are tables similar to FIG. 6B but depict some of the many alternate manners in which the engagement clutch (E), the first braking clutch (B1), and the second braking clutch (B2) may be disengaged. In FIGS. 7A and 7B, the first braking clutch (B1) may be disengaged first at stage 85 but then the engagement clutch (E) is disengaged at stage 96 leaving the second braking clutch (B2) to take the place of the engagement clutch at stage 97. Such configuration not only changes the direction of travel of the machine but also changes the gear ratio. In FIGS. 8A and 8B, the third speed clutch (S3) is engaged at stage 103 as the first braking clutch (B1) and the second speed clutch (S2) is engaged at stage 104 as the second braking clutch (B2). During shuttle shifting, the engagement clutch (E) is disengaged at stage 105 first and then the second braking clutch (B2) is disengaged at stage 106 leaving the first braking clutch (B1) to take the place of the engagement clutch at stage 97. As with FIGS. 7A and 7B, the configuration of FIGS. 8A and 8B not only changes the direction of travel of the machine but also changes the gear ratio. FIGS. 9A and 9B are is-similar to FIGS. 8A and 8B but the first braking clutch (B1) is depicted as being disengaged at stage 116 after disengagement of the engagement clutch (E) at stage 105 so that the second braking clutch becomes the engagement clutch at stage 117. From FIGS. 6A-9A and 6B-9B, it can be seen that any two of the engagement clutch (E), the first braking clutch (B1), and the second braking clutch (B2) may be disengaged during shuttle shifting with the remaining clutch functioning as the new engagement clutch and operating to define the on-going gear ratio.

Figure 10A:
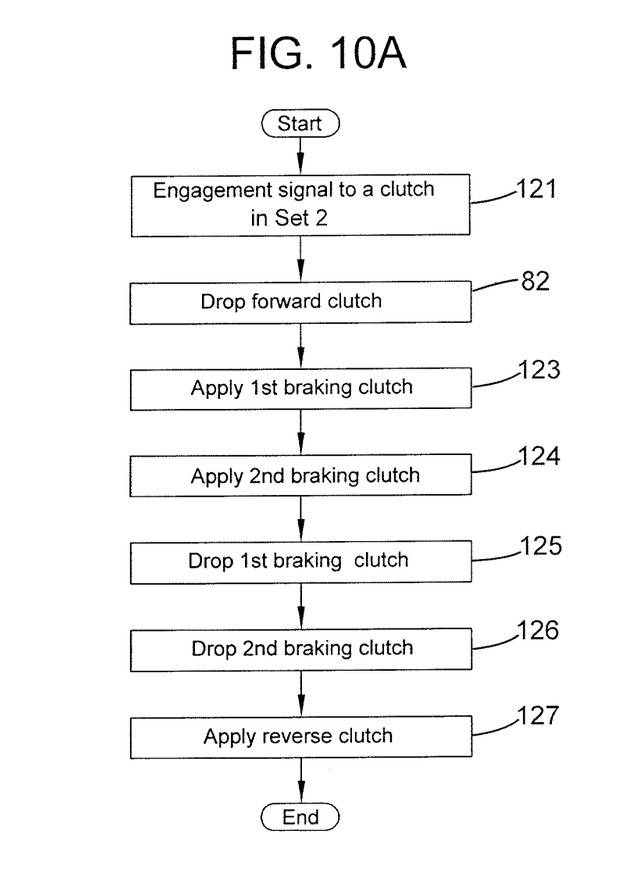
FIG. 10A is a flow diagram and FIG. 10B is a table similar to those of FIGS. 6A and 6B but with an additional speed clutch operating as an additional engagement clutch.
Figure 10B:
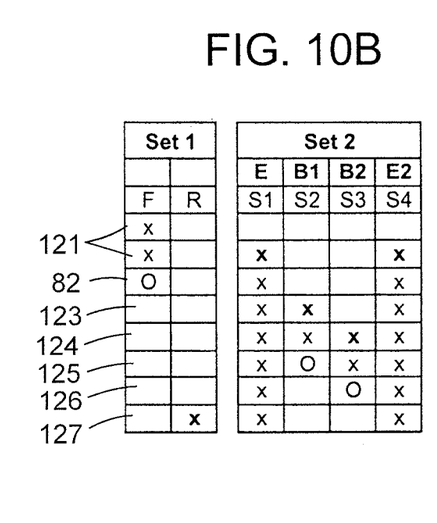

Referring to FIGS. 10A and 10B, another alternate embodiment is depicted. FIGS. 10A and 10B are similar to FIGS. 6A and 6B but includes a second speed clutch (S2) that is engaged and functions as a second engagement clutch (E2) at stage 121. A third speed clutch (S3) is engaged at stage 123 and is designated as the first braking clutch (B1). A fourth speed clutch (4) is engaged at stage 124 and is designated as the second braking clutch (B2). At the third designated trigger event $t_3$, the first braking clutch (B1) (stage 125) and the second braking clutch (B2) (stage 126) are disengaged. Both the engagement clutch (E) and the second engagement clutch (E2) remain engaged, and the reverse clutch (R) is engaged at stage 127 and becomes the on-coming clutch.

Figure 11A:
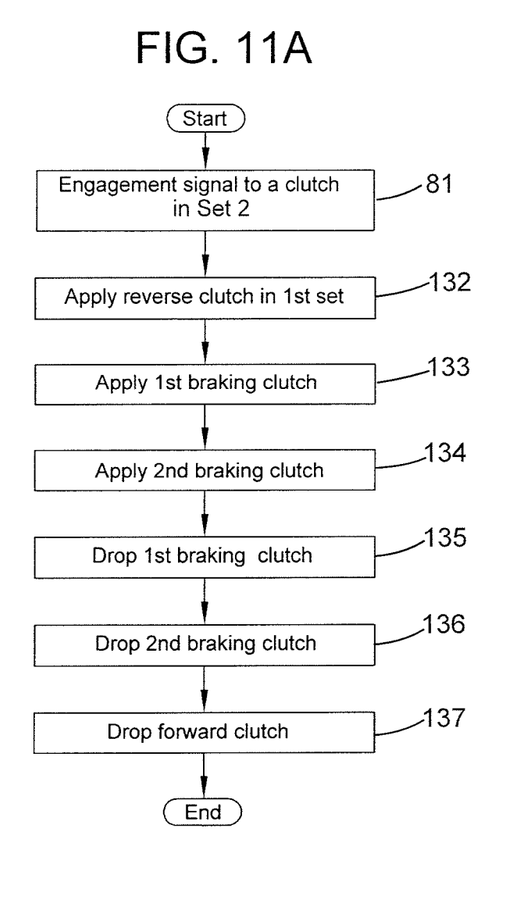
FIG. 11A is a flow diagram and FIG. 11B is a table similar to those of FIGS. 6A and 6B but with an additional directional clutch engaged during the braking process.
Figure 11B:
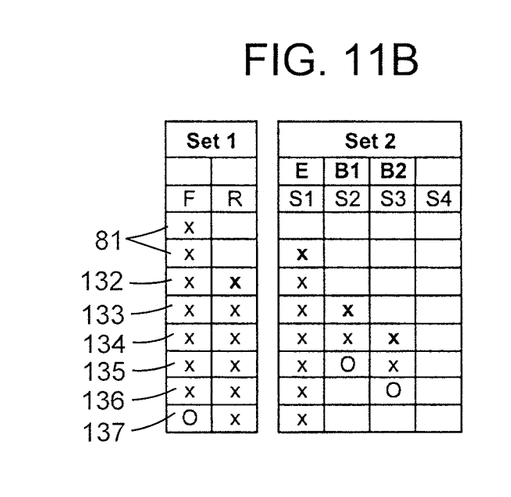

Referring to FIGS. 11A and 11B, still another alternate embodiment is depicted. FIGS. 11A and 11B are similar to FIGS. 6A and 6B but the reverse clutch (R) is engaged while the forward clutch (F) remains engaged and before the first braking clutch (B1) at stage 132 and the second braking clutch (B2) are disengaged. Once a sufficient amount of braking has occurred, the forward clutch (F) (stage 137) and two of the first braking clutch (B1) (stage 135), the second braking clutch (B2) (stage 136), and the engagement clutch (E) may be disengaged to complete the shuttle shift.

An advantage of using two or more braking clutches is that the wear caused in executing a shuttle shifting operation can be allocated or apportioned between the braking clutches in any manner desired. As a result, the wear on any one clutch may be reduced. In some systems, it may be desirable for each clutch to undergo approximately equal amounts of wear and thus allocate wear approximately evenly between the first braking clutch and the second braking clutch. For clutches having equal diameters and equal numbers of wear elements made of the same material, the wear may be evenly allocated or shared by applying equal forces through each clutch. However, the clutches within the transmission 30 often have different diameters and different numbers of wear elements and thus different amounts of surface area. For clutches made of the same material and having different surface areas, different forces must be applied through each of the first braking clutch and the second braking clutch to evenly allocate wear. Accordingly, the pressure directed to the first braking clutch and the second braking clutch will often be different, as may be seen in FIG. 4.

Temperature rise of the friction material within a clutch may be used to measure wear allocation. Temperature rise is often proportional to the wear of a clutch. As a result, during a particular braking operation, the wear of a braking clutch may be monitored by monitoring the rise in temperature of the clutch. Many of the friction materials typically used with clutches tend to wear at substantially greater rates above a predetermined temperature for each material. Accordingly, in some configurations, it may be desirable to not only monitor the temperature rise within each clutch but to also avoid allowing the temperature of each braking clutch to rise above the predetermined value. Thus, the controller 41 may be set so that the pressure associated with each of the first braking clutch and the second braking clutch results in the first braking clutch and the second braking clutch each undergoing approximately equal rises in temperature.

The energy absorbed per unit area of a clutch also provides a convenient means of approximating the temperature rise in a clutch. Consequently, another manner of allocating wear between the first braking clutch and the second braking clutch is to set the energy absorbed per unit area of each clutch as approximately equal. This may be accomplished by calculating the areas of each of the first braking clutch and the second braking clutch and applying a different force through each of the clutches. If desired, the amount of energy to be absorbed may be set so as to be maintained below a predetermined threshold. This threshold may be based upon the material from which the wear elements of the clutches is formed.

In some situations, it may be desirable to allocate wear between braking clutches in an unequal manner. As an example, if one clutch is anticipated to be used less than others for shifting gears during the life of the transmission, it may be desirable for that clutch to undergo more wear than others during the various braking processes. In one example, the energy could be shared equally between clutches but with the "lesser used" clutch used more frequently during the braking process (as compared to other clutches). In another example, a greater force could be applied through the "lesser used" clutch which would result in it experiencing greater wear during the braking process as compared to other clutches. In both cases, the overall wear on the "lesser used" clutch due to the braking process would be greater as compared to other clutches. As a result, wear on the other clutches due to the braking process may be reduced and the balancing of wear between the clutches could be used to extend the overall life of the transmission 30. In one example, the first braking clutch and the second braking clutch may undergo approximately unequal amounts of wear. In another example, the first braking clutch and the second braking clutch may undergo approximately unequal rises in temperature. In such case, it may be desirable for the temperature of each clutch to be maintained below a predetermined temperature.

INDUSTRIAL APPLICABILITY

The industrial applicability of the system described herein will be readily appreciated from the foregoing discussion. The present disclosure is applicable to transmissions 30 that may be used for directional or shuttle shifting operations. Shuttle shifting operations require the dissipation of energy in the form of momentum prior to re-engagement of the transmission 30. The energy may be dissipated through the use of braking or tie-up within the transmission 30. Such braking may cause significant or premature wear on some of the clutches within the transmission. In one aspect, controller 41 may be configured to allocate the braking forces between more than one clutch of the transmission. Allocating the energy absorption reduces the wear on any one clutch and thus may extend the life of the transmission.

The allocation of energy may be set so as to generally equally share wear between the clutches. In one aspect, the energy may be allocated so that the wear is evenly shared between clutches. In another aspect, the allocation may be made so as to share the wear of a particular shuttle shifting operation in an unequal manner and thus allocate clutch wear over the life of the transmission in a desired manner. In another aspect, the wear may be shared so that the energy dissipated per unit area is generally equal. In another aspect, the wear per unit area may be maintained below a predetermined threshold. In still another aspect, the clutches may undergo approximately equal rises in temperature. If desired, the allocation of energy between clutches may be set so that wear is shared unequally between clutches.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A clutch control system for allocating clutch wear during shuttle shifting of a transmission, the transmission being operatively connected to a prime mover to control velocity of a machine, the transmission having a first directional clutch and a second directional clutch, the first directional clutch and the second directional clutch being operatively connected to an input shaft of the transmission, a plurality of additional clutches operatively connected to an output shaft of the transmission, a first of the additional clutches operating as an engagement clutch, a second of the additional clutches operating as a first braking clutch, and a third of the additional clutches operating as a second braking clutch, comprising:
a controller configured to:
transmit a first engagement signal to engage the engagement clutch;
transmit an isolation signal to disengage the first directional clutch and isolate the prime mover from the additional clutches;
transmit a first braking signal to the first braking clutch to apply a first braking force;
transmit a second braking signal to the second braking clutch to apply a second braking force before reducing the first braking force, the engagement clutch, the first braking clutch and the second braking clutch cooperating to apply a combined force to slow rotation of the output shaft;
transmit a first reduction signal to one of the engagement clutch, the first braking clutch, and the second braking clutch to reduce the combined force;
transmit a second reduction signal to another of the engagement clutch, the first braking clutch, and the second braking clutch to reduce the combined force; and
transmit a second engagement signal to engage the second directional clutch upon an occurrence of a designated trigger event.

2. The clutch control system of claim 1, wherein the designated trigger event is the machine reaching a predetermined velocity.

3. The clutch control system of claim 2, wherein the predetermined velocity is approximately zero.

4. The clutch control system of claim 1, wherein the designated trigger event is a passage of a predetermined amount of time.

5. The clutch control system of claim 4, wherein the predetermined amount of time is based upon a velocity of the machine upon inception of a shuttle shifting operation.

6. The clutch control system of claim 1, wherein the first reduction signal is transmitted based upon an occurrence of a second designated trigger event.

7. The clutch control system of claim 1, wherein the first braking clutch and the second braking clutch are applied so as to dissipate generally equal energy per unit area of each of the first braking clutch and the second braking clutch.

8. The clutch control system of claim 7, wherein the energy per unit area of each of the first braking clutch and the second braking clutch is generally maintained below a predetermined threshold.

9. The clutch control system of claim 1, wherein the first braking clutch and the second braking clutch are applied so that the first braking clutch and the second braking clutch undergo approximately equal rises in temperature.

10. The clutch control system of claim 1, wherein the first braking clutch and the second braking clutch are applied so that the first braking clutch and the second braking clutch undergo approximately equal amounts of wear.

11. The clutch control system of claim 1, wherein the first braking clutch and the second braking clutch are applied so as to dissipate generally unequal energy per unit area of each of the first braking clutch and the second braking clutch.

12. The clutch control system of claim 11, wherein the energy per unit area of each of the first braking clutch and the second braking clutch is generally maintained below a predetermined threshold.

13. The clutch control system of claim 1, wherein the first braking clutch and the second braking clutch are applied so that the first braking clutch and the second braking clutch undergo unequal rises in temperature.

14. The clutch control system of claim 1, wherein the first braking clutch and the second braking clutch are applied so that the first braking clutch and the second braking clutch undergo unequal amounts of wear.

15. A clutch control system for allocating clutch wear during shifting of a transmission, the transmission being operatively connected to a prime mover to control velocity of a machine, the transmission having a plurality of clutches in a first set operatively connected to a rotatable input shaft of the transmission, and a plurality of clutches in a second set operatively connected to a rotatable output shaft of the transmission, the first set of clutches operating to isolate the prime mover from the second set of clutches, the second set of clutches including an engagement clutch, a first braking clutch, and a second braking clutch, comprising:
a controller configured to:
transmit a first engagement signal to engage the engagement clutch;
transmit an isolation signal to disengage one of the clutches of the first set to isolate the second set of clutches from the prime mover;
transmit a first braking signal to the first braking clutch to apply a first braking force;
transmit a second braking signal to the second braking clutch to apply a second braking force before reducing the first braking force, the engagement clutch, the first braking clutch and the second braking clutch cooperating to apply a combined force to slow rotation of the rotatable output shaft;
transmit a first reduction signal to one of the engagement clutch, the first braking clutch, and the second braking clutch to reduce the combined force;
transmit a second reduction signal to another of the engagement clutch, the first braking clutch, and the second braking clutch to reduce the combined force; and
transmit a second engagement signal to engage another of the clutches of the first set upon an occurrence of a designated trigger event.

16. The clutch control system of claim 15, wherein one of the clutches is a first directional clutch for rotating the rotatable output shaft in a first direction and another of the clutches is a second directional clutch for rotating the output shaft in a second direction, the second direction being opposite the first direction.

17. The clutch control system of claim 16, wherein the first directional clutch and the second directional clutch are within the first set of clutches.

18. The clutch control system of claim 16, wherein the first directional clutch and the second directional clutch are within the second set of clutches.

19. A method of allocating clutch wear during shuttle shifting of a transmission, the transmission having a first directional clutch and a second directional clutch, the first directional clutch and the second directional clutch being operatively connected to a rotatable input shaft of the transmission, and a plurality of additional clutches operatively connected to a rotatable output shaft of the transmission, a first of the additional clutches operating as an engagement clutch, a second of the additional clutches operating as a first braking clutch, a third of the additional clutches operating as a second braking clutch, the method comprising:

engaging the engagement clutch;

disengaging the first directional clutch to isolate the additional clutches from a prime mover;

engaging the first braking clutch to apply a first braking force;

engaging the second braking clutch to apply a second braking force before reducing the first braking force, the engagement clutch, the first braking clutch and the second braking clutch cooperating to apply a combined force to slow rotation of the output shaft;

disengaging one of the engagement clutch, the first braking clutch, and the second braking clutch to reduce the combined force;

disengaging another of the engagement clutch, the first braking clutch, and the second braking clutch to reduce the combined force;

engaging the second directional clutch upon an occurrence of a designated trigger event.

20. The method of claim 19, wherein the first braking clutch and the second braking clutch are applied so as to dissipate energy such that energy per unit area of the first braking clutch and the second braking clutch is generally maintained below a predetermined threshold.

\* \* \* \* \*